(12) United States Patent
Poggi et al.

(10) Patent No.: US 8,257,554 B2
(45) Date of Patent: Sep. 4, 2012

(54) UREA-FORMALDEHYDE RESIN COMPOSITION AND PROCESS FOR MAKING FIBER MATS

(75) Inventors: Mark Poggi, Atlanta, GA (US); Kelly Shoemake, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 452 days.

(21) Appl. No.: 11/560,921

(22) Filed: Nov. 17, 2006

(65) Prior Publication Data
US 2008/0083522 A1   Apr. 10, 2008

Related U.S. Application Data

(60) Provisional application No. 60/828,252, filed on Oct. 5, 2006.

(51) Int. Cl.
*D21H 17/20* (2006.01)
*D21H 17/33* (2006.01)
*D21H 21/18* (2006.01)

(52) U.S. Cl. ............. 162/164.6; 162/158; 162/164.1; 106/287.29; 106/287.3; 528/259

(58) Field of Classification Search ............ 106/287.29, 106/287.3
See application file for complete search history.

(56) References Cited

U.S. PATENT DOCUMENTS

| | | | |
|---|---|---|---|
| 2,487,766 A | 11/1949 | Schmidt | |
| 2,906,660 A | 9/1959 | Hungerford et al. | |
| 3,012,929 A | 12/1961 | Jackson | |
| 3,050,427 A | 8/1962 | Slayter et al. | |
| 3,103,461 A | 9/1963 | Smith et al. | |
| 3,228,825 A | 1/1966 | Waggoner | |
| 3,524,763 A * | 8/1970 | Taravella et al. | 442/104 |
| 3,622,445 A * | 11/1971 | Heidweiller | 162/145 |
| 3,760,458 A | 9/1973 | Pitt | |
| 3,766,003 A | 10/1973 | Schuller | |
| 3,838,995 A | 10/1974 | Smith | |
| 3,905,067 A | 9/1975 | Keib et al. | |
| 4,112,174 A | 9/1978 | Hannes et al. | |
| 4,258,098 A | 3/1981 | Bondoc et al. | |
| 4,347,271 A * | 8/1982 | Shannon | 428/34.5 |
| 4,395,306 A * | 7/1983 | Killat | 162/156 |
| 4,403,013 A | 9/1983 | Robitschek et al. | |
| 4,430,158 A | 2/1984 | Jackey et al. | |
| 4,457,785 A | 7/1984 | Hsu et al. | |
| 4,521,494 A * | 6/1985 | Mani | 428/514 |
| 4,526,914 A | 7/1985 | Dolin | |
| 4,536,446 A | 8/1985 | Hsu et al. | |
| 4,560,612 A | 12/1985 | Yau | |
| 4,596,737 A | 6/1986 | Werbowy et al. | |
| 4,681,802 A | 7/1987 | Gaa et al. | |
| 4,810,576 A | 3/1989 | Gaa et al. | |
| 4,917,764 A | 4/1990 | Lalwani et al. | |
| 5,362,842 A | 11/1994 | Graves et al. | |
| 5,389,716 A * | 2/1995 | Graves | 524/510 |
| 5,445,878 A | 8/1995 | Mirous | |
| 5,518,586 A | 5/1996 | Mirous | |
| 5,624,743 A * | 4/1997 | Malhotra | 428/216 |
| 5,656,366 A | 8/1997 | Mirous | |
| 5,804,254 A | 9/1998 | Nedwick et al. | |
| 5,837,620 A | 11/1998 | Kajander | |
| 5,851,933 A | 12/1998 | Swartz et al. | |
| 5,914,365 A | 6/1999 | Chang et al. | |
| 5,935,879 A | 8/1999 | Helwig et al. | |
| 5,972,166 A | 10/1999 | Helwig et al. | |
| 6,084,021 A * | 7/2000 | Chang et al. | 524/512 |
| 6,251,224 B1 * | 6/2001 | Dong | 162/145 |
| 6,267,843 B1 | 7/2001 | Helwig et al. | |
| 6,291,552 B1 | 9/2001 | Dong | |
| 6,365,001 B1 | 4/2002 | Helwig et al. | |
| 6,384,116 B1 | 5/2002 | Chan et al. | |
| 6,544,911 B2 | 4/2003 | Peng et al. | |
| 6,548,155 B1 | 4/2003 | Jaffee | |
| 6,642,299 B2 * | 11/2003 | Wertz et al. | 524/512 |
| 6,737,369 B2 | 5/2004 | Peng et al. | |
| 6,740,373 B1 * | 5/2004 | Swoboda et al. | 428/34.2 |
| 6,770,169 B1 | 8/2004 | Wallace | |
| 2004/0121075 A1 * | 6/2004 | Grove et al. | 427/256 |
| 2004/0192148 A1 * | 9/2004 | Kajander | 442/417 |
| 2004/0197468 A1 * | 10/2004 | Geel et al. | 427/180 |
| 2004/0197500 A9 * | 10/2004 | Swoboda et al. | 428/34.2 |
| 2005/0070186 A1 * | 3/2005 | Shoemake et al. | 442/176 |
| 2005/0191922 A1 * | 9/2005 | Xing et al. | 442/175 |
| 2006/0057919 A1 * | 3/2006 | Xing et al. | 442/180 |

FOREIGN PATENT DOCUMENTS

EP   0546750   6/1993

(Continued)

OTHER PUBLICATIONS

Abstract of Bandhagen, et al.; "Aqueous Curing Agent for Carbamide Resins"; Database WPI Week 198113; Derwent Publications Ltd.; Ref No. XP-002468909; May 27, 1980.

(Continued)

*Primary Examiner* — Matthew Daniels
*Assistant Examiner* — Dennis Cordray
(74) *Attorney, Agent, or Firm* — Ram W. Sabnis

(57) ABSTRACT

A thermosetting urea-formaldehyde (UF) resin composition containing a rheological-enhancing amount of a thickening agent, the use of the resin composition for formulating an adhesive binder for preparing fiber mats and the fiber mats made using the adhesive binder, wherein improved mat properties and faster cure speeds can be obtained.

19 Claims, No Drawings

FOREIGN PATENT DOCUMENTS

| | | |
|---|---|---|
| EP | 0763505 A1 | 3/1997 |
| EP | 1095955 A1 | 5/2001 |
| EP | 1881032 A1 | 1/2007 |
| WO | WO02051936 A1 | 7/2002 |
| WO | WO 2004/039851 A2 * | 5/2004 |
| WO | WO 2004/041874 A1 * | 5/2004 |
| WO | WO2005035653 A1 | 4/2005 |

OTHER PUBLICATIONS

Liu, Qingpu, et al.; "Studies on IPN of Polyacrylamide Inverse Emulsion and Modified Urea-Formaldehyde Resin"; Mar. 2, 1995; vol. 14 No. 4.

European Patent Office; "International Search Report"; Mailed Feb. 26, 2008.

* cited by examiner

UREA-FORMALDEHYDE RESIN COMPOSITION AND PROCESS FOR MAKING FIBER MATS

CROSS-REFERENCE TO RELATED APPLICATIONS

This application claims the benefit of priority of U.S. Provisional Patent Application No. 60/828,252, filed Oct. 5, 2006, which is hereby incorporated by reference in its entirety.

BACKGROUND OF THE INVENTION

1. Field of the Invention

This invention relates to a modified, thermosetting urea-formaldehyde resin composition useful for preparing a binder formulation, such as for making fiber mats, particularly glass fiber mats, to a process of preparing the fiber mats using the binder formulation and to the fiber mats prepared using the modified urea-formaldehyde resin composition in a binder formulation. In particular, the invention relates to a thermosetting urea-formaldehyde (UF) resin modified by the addition of a rheological-enhancing amount of a thickening agent.

2. Description of Related Art

Glass fiber mats, fiber mats made from synthetic fibers and mats made from fiber blends find wide application in the building materials industry, for example, as insulation, as a substrate for making composite flooring, as a substrate for making roofing shingles, as a substrate for making siding (replacing similar sheets traditionally made using wood, cellulose or asbestos fibers), as substrate for printed circuit boards or battery separators, as filter stock, as tape stock, as reinforcement scrim in cementitious and non-cementitious coatings for masonry and as facing material for laminated articles such as foam composites and gypsum boards.

Such fiber mats are made in a range of thickness and densities, by entangling, often short, staple fibers, long continuous fibers and mixtures thereof, and are generally referred to as non-woven mats.

Some non-woven fiber mats, and especially relatively thin non-woven glass fiber mats, usually are made commercially by a wet-laid process, which is carried out on what can be viewed as modified papermaking machinery. Descriptions of the wet-laid process may be found in a number of U.S. patents, including U.S. Pat. Nos. 2,906,660; 3,012,929; 3,050,427; 3,103,461; 3,228,825; 3,760,458; 3,766,003; 3,838,995; 3,905,067; 4,112,174; 4,681,802 and 4,810,576.

In general, the wet-laid process for making fiber mats comprises first forming an aqueous slurry of short-length fibers, usually glass fibers (referred to in the art as "white water") under agitation in a mixing tank, then feeding the slurry onto a moving screen on which the fibers enmesh themselves into a freshly prepared wet fiber mat, while excess water is separated from the mat of fibers.

Machines such as wire cylinders, Fourdrinier machines, Stevens Former, Roto Former, Inver Former, Venti Former machines and the like can be used to form the wet-laid mat. In such equipment, a head box deposits the slurry onto a moving wire screen. Suction or vacuum removes the water resulting in the wet-laid mat.

Unlike natural fibers such as cellulose or asbestos, glass fibers and some synthetic fibers generally do not disperse well in water. To overcome this problem, it has been the industry practice to provide suspending aids for the fibers. Such suspending aids or dispersants usually are materials that increase the viscosity of the aqueous medium. Suitable dispersants conventionally employed in the art include polyacrylamides, hydroxyethyl cellulose (HEC), carboxymethyl cellulose (CMC), ethoxylated amines and amine oxides. Other additives such as surfactants, lubricants and defoamers also conventionally have been added to the white water. Such agents, for example, further aid the wettability and dispersion of the fibers. Experience has shown that such additives also often influence the strength of the wet fiber mat.

The fiber slurry deposited on the moving screen or cylinder is processed into a sheet-like fiber mat by the removal of water, usually by suction and/or vacuum devices, and is followed by the application of an adhesive binder formulation to the mat. In the manufacture of fiber mats, a high degree of flexibility and tear strength is desired in the finished mat in addition to primary dry tensile and wet tensile properties. An adhesive binder formulation is therefore used to hold the fiber mat together. The binder formulation is impregnated directly into the fibrous mat and set or cured immediately thereafter (usually by the application of heat by passing the mat through a drying oven) to provide the desired mat integrity.

The binder formulation is applied to the mat by soaking the mat in an excess of binder solution or suspension, or more usually by impregnating the mat with the adhesive binder formulation by means of a binder applicator, for example, by a roller coater, curtain coater, dip and squeeze applicator, or spray coater to name a few. One of the primary binder applicators for conventional fiber mat machines has been the falling film curtain coater. Suction devices often are also utilized for further removal of water and excess binder and to ensure a thorough application of binder through the full thickness of the fiber mat.

A widely used binder formulation for making fiber mats, especially glass fiber mats, is based on a thermosetting urea-formaldehyde (UF) resin, which often is fortified with an emulsion polymer. UF resins have commonly been employed because they are relatively inexpensive In addition to mat strength properties which the binder formulation imparts to the ultimately cured mat, the binder also functions to improve the strength of the uncured, wet-laid mat as it is transported from its initial formation into and through the curing oven. Such incipient pre-cured strength is needed to avoid process delays and shutdowns caused by breaks in the endless mat.

Thus incorporated adhesive binder formulation is dried and thermally cured, typically in an oven at elevated temperatures. Generally, a temperature in the range of about 200 to 400° C. is used during the heating step. The necessary heat energy can be supplied in any manner known in the art including direct-fired ovens, convection ovens, or by radio frequency (RF) or dielectric heating. Normally, heat treatment alone will effect curing of the binder. Catalytic-assisted curing, such as is accomplished with addition of an acid catalyst (for example ammonium chloride or p-toluene sulfonic acid) to the binder composition is an optional, alternative. The resulting cured mat is normally wound into rolls, packaged and shipped to a point of use.

Because fiber mats made with an adhesive binder formulation consisting predominantly of a UF resin often are brittle, or because the strength properties of the mats may deteriorate appreciably subsequent to their preparation, especially when the mats are subjected to wet conditions, UP resin-based adhesive binder formulations have often been modified by fortifying the UF resin with a large amount of latex (emulsion) polymer, usually a polyvinyl acetate, vinyl acrylic or styrene-butadiene polymer. Certain latexes have been shown to provide increased tensile strength and tear strength in the fiber mat. The use of styrene-butadiene latex-fortified, urea-formaldehyde resin compositions in preparing an adhesive binder formulation for making glass fiber mats is disclosed, for example, in U.S. Pat. Nos. 4,258,098; 4,560,612 and 4,917,764.

U.S. Pat. No. 4,917,764 highlights another problem sometimes encountered during the manufacture of fiber mats, especially when using the falling film curtain coater adhesive binder application technique. In particular, conventional UF resin-based adhesive binder formulations are sometimes deficient in providing an even deposition of the adhesive binder formulation on the mat. This uneven application of the adhesive binder formulation to the mat contributes to non-uniform mat properties.

Applicant now has determined that this problem is related to the rheological behavior of such UF resin-based adhesive binder formulations. In particular, applicant has discovered that by modifying a thermosetting UF resin composition with a small amount of a thickening agent, the rheological characteristic of an adhesive binder formulation made using the thermosetting UF resin composition is significantly improved, allowing the adhesive binder formulation to be applied evenly at high mat manufacturing speeds even using a curtain coater.

BRIEF DESCRIPTION OF THE INVENTION

The invention is directed to a thermosetting urea-formaldehyde (UF) resin that has been modified by the addition of a rheological-enhancing amount of a thickening agent. The invention also is directed to an aqueous binder formulation containing as its major component the so-modified thermosetting, UF resin. Furthermore, the invention also is directed to a process for preparing a fiber mat, particularly a glass fiber mat, using the binder formulation, and to fiber mats produced by the method. In this regard, the invention is especially directed to a process for preparing fiber mats using the wet-laid process where the adhesive binder is applied using a curtain coater. Thin mats made using a binder formulation based on the modified thermosetting, UF resin of the present invention are useful, for example, as substrates in the manufacture of roofing shingles and composite flooring.

The invention is based on the discovery that adding a rheological-enhancing amount of a thickening agent to a thermosetting urea-formaldehyde (UF) resin composition, which then is used to produce an adhesive binder formulation, for example by adding water and other conventional binder additives to the so-modified UF resin, produces adhesive binder formulations that exhibit improved processing characteristics when used in the manufacture of wet-laid non-woven mats.

In particular, adhesive binder formulations made with the so-modified UF resin composition can be applied more evenly to a non-woven fiber mat using a falling film curtain coater even at the high speed manufacturing conditions of current non-woven mat forming equipment than can formulations made with the unmodified UF resin composition. Such machines routinely operate at speeds in excess of 10 feet per second and especially in excess of 15 feet per second. Fiber mats prepared using an adhesive binder formulated using the so-modified thermosetting UF resin composition thus exhibit more uniform structural properties, such as tensile and tear strength properties, in the machine and cross-machine directions.

In manufacturing fiber mats in accordance with the invention, fibers, e.g., inorganic fibers such as glass fibers or mineral fibers, or synthetic fibers, such as polyolefin fibers, or fiber blends are slurried into an aqueous medium, referred to in the art as "white water." As noted above, the aqueous medium also typically contains a dispersant for facilitating formation of the fiber slurry. Dispersants such as polyacrylamides, hydroxyethyl cellulose, ethoxylated amines and amine oxides are common, though the present invention should not be limited to any specific dispersant/viscosity enhancer package for the white water.

The so-formed fiber slurry then is dewatered on a foraminous surface or screen to form a wet, non-woven fiber mat. An adhesive binder formulation, made by diluting the modified, thermosetting UF resin binder of the present invention with water and optionally adding other ingredients, then is applied, such as by a falling film curtain coater, to the wet mat before it passes through a drying (curing) oven. In the drying oven, the non-woven fiber mat is dried and any incorporated adhesive binder (containing the thermosetting UF resin composition) is cured. As demonstrated in part by subsequent examples, fiber mats produced in accordance with the invention exhibit improved mat strengths, including dry and wet tensile strengths and tear strength and in some instances a faster rate of cure.

DETAILED DESCRIPTION OF THE INVENTION

As used herein the terms "fiber," "fibrous" and the like are intended to embrace materials that have an elongated morphology exhibiting an aspect ratio (length to thickness) of greater than 100, generally greater than 500, and often greater than 1000. Usually, such fibers have a length between 0.25 and 5.0 inches.

As used herein the terms "heat resistant fibers" and the like are intended to embrace fibers suitable for withstanding elevated temperatures such as mineral fibers, aramid fibers, ceramic fibers, metal fibers, carbon fibers, polyimide fibers, certain polyester fibers, rayon fibers, and especially glass fibers. Such fibers are substantially unaffected by exposure to temperatures above about 120° C.

As used herein, "aqueous" means water and mixtures composed substantially of water.

As used herein, "curing," "cured" and similar terms are intended to embrace the structural and/or morphological change which occurs to an aqueous adhesive binder formulation based on a thermosetting urea-formaldehyde resin, such as, for example, by covalent chemical reaction (crosslinking), ionic interaction or clustering, improved adhesion to the substrate, phase transformation or inversion, and hydrogen bonding when the resin is dried and heated to cause the properties of a flexible, porous substrate, such as a mat of fibers to which an effective amount of the binder has been applied, to be altered.

Throughout the specification and in the claims, terms such as "cured binder" and the like mean the thermoset urea-formaldehyde resin which bonds the fibers of a fibrous product together. Generally, the bonding occurs at the intersection of overlapping fibers.

The process of forming a non-woven fiber mat, and especially a heat resistant fiber mat, such as a glass fiber mat, in accordance with the present invention generally begins with fibers of suitable length and diameter for the intended application, such as chopped bundles of glass. While reference is made hereinafter to using chopped bundles of glass fibers, other fiber types, e.g., mineral fibers, synthetic fibers, such as polyethylene, polypropylene, polyester and nylon fibers, and mixtures of various fiber types, and other forms of fibers such as continuous strands, may also be used.

Generally, fibers having a length of about ¼ inch to 5 inches (about 6 to about 140 mm) and a diameter of about 3 to 25 microns are used for most non-woven mat applications. Short and long fibers can be mixed to form a mat web of increased fiber entanglement. Glass fiber bundles, which may contain from about 20 to 500, or more, of such fibers, are available commercially from Owens-Corning Fiberglass and Johns-Manville (Schuller).

The fibers are added to an aqueous dispersant medium to form an aqueous slurry, known in the art as "white water." The white water typically contains about 0.5% by weight fibers. Any viscosity modifier or dispersant, including those commonly used in the past, can be used in the practice of the present invention including hydroxyethyl cellulose, ethoxylated amines, polyacrylamides, amine oxides and the like. Again, the present invention is not limited to any specific viscosity modifier. The amount of viscosity modifier used to make the fiber dispersion should be effective to provide the viscosity needed to suspend the fibers in the white water as needed to practice the method used to form the wet laid mat. The white water viscosity is generally in the range of 1 to 20 cps, preferably 1.5 to 8 cps. The fiber slurry then is agitated to form a workable, uniform dispersion of fibers having a suitable consistency. The viscosity modifier also may contain other conventional additives known in the art. These include dispersion aids, surfactants, lubricants, defoamers, biocides and the like.

The fiber/water dispersion then is passed to a mat-forming machine typically containing a mat-forming screen. On route to the screen, the dispersion often is diluted further with water to a lower fiber concentration. The fibers are collected at the screen in the form of a wet fiber mat and excess water is removed by gravity or, more often, by vacuum assist in a conventional manner.

An adhesive binder formulation, made by diluting a modified thermosetting UF resin composition of the present invention with water, then is applied to the gravity- or vacuum-assisted dewatered wet fiber mat. Application of the binder composition may be accomplished by any conventional means, such as by soaking the mat in an excess of binder solution or suspension, or by coating the mat surface with binder by means of a binder applicator, especially by use of a falling film curtain coater.

The thermosetting urea-formaldehyde (UF) resin used as the major component of the adhesive binder formulation is prepared from urea and formaldehyde monomers and UF precondensates in manners well known to those skilled in the art. The method of making the base UF resin forms no part of the present invention. Suitable resins are commercially available and the present invention can advantageously be applied to all thermosetting UF resin compositions suitable for making binder compositions for the manufacture of fiber mats. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention.

One useful class of thermosetting UF resins for use in preparing an adhesive binder formulation in accordance with the present invention is disclosed in U.S. Pat. No. 5,362,842, the disclosure of which is incorporated herein by reference.

As well-understood by those skilled in the art, formaldehyde for making a suitable thermosetting UF resin is available in many forms. Paraform (solid, polymerized formaldehyde) and formalin solutions (aqueous solutions of formaldehyde, sometimes with a small amount of methanol, in 37 percent, 44 percent, or 50 percent formaldehyde concentrations) are commonly used forms. Formaldehyde also is available as a gas. Any of these forms is suitable for use in preparing a thermosetting UF resin in the practice of the invention. Typically, formalin solutions are preferred as the formaldehyde source for ease of handling and use.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716 and are well known to skilled workers.

Any of the wide variety of procedures used for reacting the principal urea and formaldehyde components to form an aqueous thermosetting UF resin composition also can be used, such as staged monomer addition, staged catalyst addition, pH control, amine modification and the like. The present invention is not to be limited to a restricted class of UF resins for making fiber mats. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the U-F resin is highly water dilutable, if not water soluble.

Many thermosetting urea-formaldehyde resin compositions, which may be used in the practice of this invention, are commercially available. Urea-formaldehyde resins such as the types sold by Georgia Pacific Resins, Inc. (available as GP-2928, GP-2948, GP-2981 and GP-2997) for glass fiber mat applications, those sold by Borden Chemical Co., and by Dynea also may be used. These resins are prepared in accordance with the previous teachings and contain reactive methylol groups, which upon curing form methylene or ether linkages. Such methylol-containing adducts may include N,N'-dimethylol, dihydroxymethylolethylene; N,N'bis (methoxymethyl), N,N'-dimethylolpropylene; 5,5-dimethyl-N,N'dimethylolethylene; N,N'-dimethylolethylene; and the like.

Thermosetting urea-formaldehyde resins useful in the practice of the invention generally contain 45 to 75% by weight, and preferably, 50 to 65% by weight non-volatiles (often referred to simply as solids), generally have a viscosity (before modification in accordance with the present invention) of about 100 to 300 cps, normally exhibit a pH of 7.0 to 9.0, preferably about 7.5 to 8.5, and often have a free formaldehyde level of not more than about 3.0%, often less than 1% and a water dilutability of 1:1 to 100, 1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into CF resins used in the invention. Concentrations of these modifiers in the reaction mixture often will vary from 0.05 to 15.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

In accordance with the present invention, the thermosetting UF resin is modified by the addition of a thickening agent. The thickening agent is added in a rheological-enhancing amount to the thermosetting UF resin. As used herein, the phrase "rheological-enhancing count" is intended to embrace an amount of thickening agent that increases the viscosity of the thermosetting urea-formaldehyde resin by at least about 5%. Preferably the viscosity is increased by 10% and it is most preferred to increase the viscosity by at least 15% through the addition of the thickening agent.

As noted above, the present invention is based on the discovery that by adding this rheological-enhancing amount of a thickening agent to a conventional thermosetting UF resin composition, where the resin is then used for making an adhesive binder formulation for a non-woven fiber mat, the processability characteristics of the so-prepared adhesive binder formulation, when used in the manufacture of wet-laid non-woven mats, is significantly improved. In particular, the so-modified thermosetting UF resin, following dilution with water and the addition of other conventional binder additives, yields an adhesive binder formulation that has improved rheological properties, allowing the binder to be applied more evenly to a non-woven fiber mat, particularly when applied through the use of a falling film curtain coating applicator and especially at the high machine speeds common to conventional mat manufacturing operations. Indeed, in trials using an adhesive binder formulated with the modified UF resin composition of the present invention and applied by a curtain coater, a more even coating of the binder on the fiber mat has been observed at machine speeds in excess of 10 feet per second.

In the context of the present invention, thickening agents are polymeric-type materials that are at least partially water soluble and which, when added to a thermosetting UF resin composition, increase the resin's viscosity without substantially modifying other resin properties. Representative of such thickening agents are polysaccharides, such as xanthan gum, guar gum, modified starches and the like; neutralized polyacrylic acid, such as sodium polyacrylate, a cellulose derivative, such as carboxymethyl cellulose and hydroxyethyl cellulose (and their soluble salts), polyacrylamides, and polyvinylalcohols. The thickening agent generally has a weight average molecular weight of at least about 100,000 and generally below about 2,000,000, more usually the thickening agent has a weight average molecular weight of at least about 200,000 and generally below about 1,000,000.

Usually, the thickening agent will be added to the thermosetting UF resin composition, where the resin composition has a non-volatiles (often referred to as solids) content of 45 to 75 percent by weight, and preferably, 50 to 65 percent by weight, in an amount of about 0.005 to 0.3 percent by weight of the UF resins non-volatiles content (i.e., on a solids per solids basis), and more usually in an amount of about 0.01 to 0.2 percent by weight of the UF resins non-volatiles content. As used herein, the solids content of a composition is determined by measuring the weight loss upon heating a small, e.g., 1-5 gram sample of the composition at about 105° C. for about 3 hours.

To prepare the modified UF resin composition, usually the thickening agent is simply added to a previously prepared aqueous thermosetting UF resin composition in a desired amount and under an ambient condition. Alternatively, it may also be possible to include the thickening agent in the reaction mixture at some point during the time period in which the UF resin composition is prepared, for example during the methylolation step, during the condensation portion of the UF synthesis or later when taking steps to reduce free formaldehyde. The aqueous, so-modified UF resin typically has a Brookfield viscosity in the range of 150 to 45° cps at a non-volatiles (solids) content of 45 to 70% by weight. As known to those skilled in the art, when used to prepare an adhesive binder for making fiber mats, the thermosetting UF resin typically is diluted with water, often to approximately 5 to 35% solids (by weight) and more usually to 20 to 30% solids (by weight), before use.

In order to insure suitable storage stability of the so-modified thermosetting UF resin composition and proper performance when the UF resin is used in the adhesive binder formulation, it is desirable that the pH of the aqueous binder formulation be adjusted to a pH within the range of about 6 to 9, and more preferably between about 7 and 8.5. Too low a pH may cause premature curing of the UF resin and incompatibility of the two constituents; while too high a pH may retard curing of the composition on heating when it is used.

The adhesive binder formulation may also contain a variety of other known additives such as a silica colloid to enhance fire resistance, antifoamers, biocides, pigments, and the like, normally in small proportions relative to the modified UF resin composition. As noted above, following synthesis of the UF resin and as part of the formulation of the binder composition of the present invention, it also is common to back-add additional urea to the resin composition. Any form of urea can be used, including UF concentrates. It also is expected that other known adjuvants, such as the styrene-maleic anhydride (SMA) copolymers of U.S. Pat. No. 5,914,365, the water-insoluble anionic phosphate ester and a fatty alcohol of U.S. Pat. No. 5,518,586, the self crosslinkable vinyl acrylic/polyvinyl acetate copolymer of U.S. Pat. No. 5,851,933 and the styrene/acrylate/acrylonitrile polymer modifier, supplemented with a polysiloxane of U.S. Pat. No. 6,544,911, all of which are incorporated herein by reference, also can be added with improved results to make the adhesive binder formulation.

The amount of adhesive binder formulation applied to the non-woven mat also can vary considerably in the broad practice of the present invention, but loadings in the range of about 3 to about 45 percent by weight, preferably about 10 to about 40 percent by weight, and more usually about 15 to about 30 percent by weight, of nonvolatile binder solids based on the dry weight of the bonded mat, will be found advantageous in preparing thin mats for construction-related applications. For inorganic fibrous mats, this value can normally be confirmed by measuring the percent loss on ignition (LOI) of the non-woven fiber mat product. Ways of assessing the adhesive binder loading for other fiber materials will be apparent to skilled workers.

As indicated earlier, the adhesive binder formulation made using the modified UF resin of this invention can be employed with any of the wide variety of fibers that can be formed into mats in any suitable manner. The fibers may be organic or inorganic, preferably inorganic fibers are used. Inorganic fibers include, but are not limited to, glass fibers, mineral fibers, ceramic fibers, graphite fibers, metal fibers and metal coated glass or graphite fibers. Asbestos fibers also could be used, but are normally undesirable for health reasons. Organic fibers include, but are not limited to, acrylic, aromatic polyamide, polyester, cellulosic fibers) and polyolefin fibers. Inorganic fibers and especially glass fibers are generally preferred.

The adhesive binder formulation sets or cures at elevated temperatures below the decomposition temperature of the UF resin. The setting or curing of the adhesive binder normally can occur at temperatures from about 135° C. to about 300° C., preferably from about 135° C. to about 275° C. At these temperatures, the binder will typically dry and cure in periods ranging from about 2 seconds to about 60 seconds. Although the binder may cure more rapidly at higher temperatures, excessively high temperatures can cause deterioration of the binder or the fibers of the mat, which in turn causes a deterioration of the bonded mat physical and functional properties. Of course, lower temperatures and/or longer times can also be employed if desired.

The finished fiber mat product generally contains between about 55% and 97% by weight fibers, usually glass fibers, and between about 3% and 45% by weight of cured binder, 15-30% of binder being most normal. The non-woven mats typically have a basis weight of 1.5 to 2.5 pounds per 100 square feet and a thickness between 5 and 50 mils.

The so-modified UF resin binder of this invention may also have application in the manufacture of fiberglass insulation.

Fiberglass insulation is typically made by spraying a dilute aqueous solution of the resin binder onto a moving mat or blanket of non-woven glass fibers, often hot from being recently formed, and then heating the mat or blanket to an elevated temperature in an oven to cure the resin.

In the broad practice of the present invention, fiber products can be formed as a relatively thin product, such as a mat having a thickness of about 10 to 50 mils; or they can be formed as a relatively thick product, such as a blanket of 12 to 14 inches or more. The time and temperature for cure for any particular fiber product will depend in part on the amount of binder in the final structure and the thickness and density of the structure that is formed and can be determined by one skilled in the art using only routine testing. For a structure having a thickness ranging from 10 mils to 1.5 inch, a cure time ranging from several seconds to 1-5 minutes usually will be sufficient at a cure temperature within the range of 175°-300° C.

The diluted resin/thickener mixtures were applied to a non-woven mat of glass fibers by sprinkling the binder onto a glass mat, formed from glass fibers typically used in the industry (e.g., JM137 1½ inch fibers) dispersed in water containing a polyacrylamide, vacuuming the excess binder off the glass fibers and then curing the sheet in an oven maintained at 250° C. for a time (as indicated in the following Table) to produce mats with equivalent percent loss on ignitions (% LOI).

A control binder also was prepared by equivalently diluting the same UF resin with DI water and was used to prepare Control samples.

At least three 11"×11" handsheet samples per resin composition were made (to approximately the same basis weight (BW)), cured and tested for dry tensile, hot/wet (HW) tensile strength (both measured using the QC1000 Tensile Tester—Thwing-Albert) and Tear strength (measured using the Elmendorf Tear Tester—Thwing-Albert).

Dry tensile strengths of mats prepared using the binder compositions were measured by subjecting 3 inch by 5 inch samples of the hand sheets, prepared in the manner outlined below, to breaking using the QC-1000 Materials Tester by the Thwing Albert Instrument Co.

Hot/wet tensile strength of mats prepared using these binder compositions were then measured by soaking the handsheets in 185° F. (85° C.) water for 10 minutes. Samples of the hand sheets (3 inches by 5 inches) were then subjected to breaking in the same tensile tester (QC-1000 Materials Tester by the Thwing Albert Instrument Co.) while they were still hot and wet.

Average results are presented in the Table below.

TABLE 1

| Sample | BW, lbs/100 ft² | % LOI | Binder cure time (min.) @ 250 C. | Average Dry Tensile (N/3 inch) | Average HW Tensile (N/3 inch) | Tear, gf | % Retention (HW/Dry) |
|---|---|---|---|---|---|---|---|
| Control | 1.82 | 20.2 | 1.5 | 429 | 258 | 587 | 60.1 |
| A | 1.85 | 19.5 | 2.0 | 426 (−3) | 246 | 766 (+179) | 57.7 |
| B | 1.86 | 20.7 | 1.5 | 492 (+63) | 301 | 701 (+114) | 61.1 |

95% confidence interval 62N for tensile and 146gf for tear.

The following example is intended to be illustrative only and does not limit the scope of the claimed invention.

Example 1

In this example, a modified thermosetting UF resin was prepared by adding 0.15 parts of Liberty® 3794 Water Soluble Polymer Suspension, available from Hercules, Inc., as a thickening agent to 99.85 parts of a 57% by weight solids UF resin available from Georgia-Pacific Resins, Inc. as 491G56. The thickening agent was added in four (4) equal parts while the UF resin was agitated and kept at a temperature of about 20° C. The added thickening agent increased the viscosity of the resin by at least 25%.

Example 2

The viscosity of a UF resin having an initial viscosity of 185 cps was increased to 201 cps (Sample A) and 220 cps (Sample B) respectively upon the addition of 0.02 and 0.05% by weight (based on UF resin solids) of Paragum 289 sodium polyacrylate solids (supplied as a 8.7% by weight aqueous solution having a viscosity of 1100 cps) to the resin. The resin/thickener mixtures were diluted to about 18% solids using DI water and used as a binder composition for a lab scale handsheet study.

As shown, the thickened samples exhibited improved tear strengths and equivalent or improved tensile strengths.

Example 3

Resin blends were prepared by adding various amounts of CMC as a thickening agent to a standard UF resin and then diluting each of the various blends to 50% solids prior to DMA analysis. Each sample tested in the DMA analysis utilized an equivalent amount of each of the respective blends.

The DMA analysis was conducted on a TA Instruments 2980 Dynamic Mechanical Analyzer with a dual cantilever clamping system. The procedure requires using four (4) braids of a fiberglass braid stacked and clamped into the three (3) clamps of the device, with the screws of the clamps tightened to 10 Newtons. A syringe is used to deliver 0.3 mL of resin or binder to the fiberglass braid with 0.15 mL added between clamps 1 and 2 and 0.15 mL added between clamps 2 and 3. The sample size is set to a length of 20 mm, a width of 16.15 mm, and a height of 1.2 mm. The instrument is set for an amplitude of 20 mm and a frequency of 20 Hz. The sample is heated at 10° C. per minute to 300° C. while recording the storage modulus and loss modulus versus temperature. The results of the testing are reported in the following table.

TABLE 2

| Resin Blend | Onset of Cure (° C.) | End of Cure (° C.) |
|---|---|---|
| UF Resin + 0.08% CMC | 157 | 212 |
| UF Resin + 0.14% CMC | 147 | 210 |
| UF Resin + 0.20% CMC | 150 | 200 |

Since each of the samples was substantially identical, the decreasing End of Cure temperature is indicative of an increasing rate of cure as additional thickening agent is added.

While the invention has been described with reference to certain preferred embodiments, and exemplified with respect thereto, those skilled in the art will appreciate that various changes, substitutions, modifications and omissions may be made without departing from the spirit of the invention. Accordingly, it is intended that the scope of the present invention be limited solely by that of the following claims. Unless otherwise specifically indicated, all percentages are based on UF resin solids. Throughout the specification and in the claims the term "about" is intended to encompass + or −5%.

We claim:

1. A fiber mat adhesive comprising a thermosetting urea-formaldehyde resin and a thickening agent, wherein the adhesive contains about 5 to about 35% solids by weight of the urea-formaldehyde resin, wherein the thickening agent is selected from the group consisting of: polyacrylamides; polyvinyl alcohols; and mixtures thereof, and wherein the thickening agent is present in an amount of about 0.005 to about 0.3 pounds per hundred pounds of the urea-formaldehyde resin solids.

2. The fiber mat adhesive of claim 1, wherein the thickening agent is present in an amount of about 0.01 to about 0.2 pounds per hundred pounds of the urea-formaldehyde resin solids.

3. The fiber mat adhesive of claim 1, wherein the adhesive consists essentially of the urea-formaldehyde resin and the thickening agent.

4. The fiber mat adhesive of claim 1, wherein the adhesive consists essentially of the urea-formaldehyde resin, the thickening agent, and one or more additives selected from the group consisting of a silica colloid, an antifoamer, a biocide, a pigment, urea, a styrene-maleic anhydride copolymer, a water-insoluble anionic phosphate ester and fatty alcohol, a vinyl acrylic/polyvinyl acetate copolymer, and styrene/acrylate/acrylonitrile polymer, optionally supplemented with a polysiloxane.

5. The fiber mat adhesive of claim 1, wherein the adhesive is essentially fiber-free.

6. The fiber mat adhesive of claim 1, wherein the thickening agent is polyvinyl alcohols.

7. The fiber mat adhesive of claim 1, wherein the thickening agent is polyacrylamides.

8. A fiber mat comprising fibers bound together through a full thickness of the fiber mat with a cured adhesive comprising thermoset urea-formaldehyde resin solids and a thickening agent, wherein the thickening agent is selected from the group consisting of: polyacrylamides; polyvinyl alcohols; and mixtures thereof, and wherein the thickening agent is present in an amount of about 0.005 to about 0.3 pounds per hundred pounds of the urea-formaldehyde resin solids.

9. The fiber mat of claim 8, wherein the thickening agent is present in an amount of about 0.01 to about 0.2 pounds per hundred pounds of the urea-formaldehyde resin solids.

10. The fiber mat of claim 8, wherein the fiber mat consists essentially of the fibers and the cured adhesive, and wherein the cured adhesive consists essentially of the thermosetting urea-formaldehyde resin solids and the thickening agent.

11. The fiber mat of claim 8, wherein the fiber mat consists of the fibers and the cured adhesive, and wherein the cured adhesive consists of the thermosetting urea-formaldehyde resin solids and the thickening agent.

12. A fiber mat comprising fibers bound together through a full thickness of the fiber mat with a cured adhesive, wherein the cured adhesive consists essentially of thermoset urea-formaldehyde resin solids and a thickening agent, wherein the thickening agent is selected from the group consisting of: polyacrylamides; polyvinyl alcohols; and mixtures thereof, and wherein the thickening agent is present in an amount of about 0.005 to about 0.3 pounds per hundred pounds of the urea-formaldehyde resin solids.

13. The fiber mat of claim 12, wherein the thickening agent is present in an amount of about 0.01 to about 0.2 pounds per hundred pounds of the urea-formaldehyde resin solids.

14. The fiber mat of claim 12, wherein the fiber mat consists essentially of the fibers and the cured adhesive.

15. A process for making a non-woven fiber mat comprising:
    forming an aqueous dispersion of fibers;
    passing the dispersion through a mat forming screen to form a wet non-woven mat; and
    applying an adhesive to the wet non-woven mat at a mat speed of at least 10 feet per second using a curtain coater, the adhesive comprising a thermosetting urea-formaldehyde resin and a thickening agent, wherein the adhesive contains about 5 to about 35% solids by weight of the urea-formaldehyde resin, wherein the thickening agent is selected from the group consisting of: polyacrylamides; polyvinyl alcohols; and mixtures thereof, and wherein the thickening agent is present in an amount of about 0.005 to about 0.3 pounds per hundred pounds of the urea-formaldehyde resin solids.

16. The process of claim 15, wherein the thickening agent is present in an amount of about 0.01 to about 0.2 pounds per hundred pounds of the urea-formaldehyde resin solids.

17. The process of claim 15, wherein the adhesive is applied to the wet non-woven mat using a curtain coater at a mat speed of at least 15 feet per second.

18. The process of claim 15, wherein the adhesive further comprises a binder modifier selected from the group consisting of a styrene-maleic anhydride copolymer; a water-insoluble anionic phosphate ester and a fatty alcohol; and a styrene/acrylate/acrylonitrile polymer, optionally supplemented with a polysiloxane.

19. A fiber mat made in accordance with the process of claim 15.

* * * * *